United States Patent
Bradley et al.

(10) Patent No.: US 7,860,223 B2
(45) Date of Patent: Dec. 28, 2010

(54) METHOD AND SYSTEM FOR COMMUNICATION CONFIRMATION WARNING

(75) Inventors: Lisa M. Bradley, Cary, NC (US); Tamera L. Davis, Raleigh, NC (US); Helen L. Gawor, Apex, NC (US); Lin Sun, Morrisville, NC (US); Kaylee M. Thomsen, Durham, NC (US); ChunHui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 11/464,990

(22) Filed: Aug. 16, 2006

(65) Prior Publication Data
US 2008/0059649 A1    Mar. 6, 2008

(51) Int. Cl.
*H04M 1/64* (2006.01)
*G06F 15/16* (2006.01)
(52) U.S. Cl. ............... 379/88.12; 709/204; 709/206
(58) Field of Classification Search .......... 379/88.12; 709/204, 206
See application file for complete search history.

(56) References Cited

U.S. PATENT DOCUMENTS

2005/0281276 A1    12/2005 West et al.
2007/0033258 A1*    2/2007 Vasilaky et al. ............. 709/206

* cited by examiner

*Primary Examiner*—Curtis Kuntz
*Assistant Examiner*—Mohammad Islam
(74) *Attorney, Agent, or Firm*—Cantor Colburn LLP; Robert Straight

(57) ABSTRACT

A method to provide a confirmation warning to a target sender of an electronic communication is disclosed. The confirmation warning is provided prior to transmitting the electronic communication from the target sender to a target recipient, there being an established pattern of communication between the target sender and the target recipient. In response to determining that specified details about the electronic communication are not consistent with details about the established pattern of electronic communication, setting a pattern warning flag and saving those details of the electronic communication determined to be not consistent. In response to detecting the presence of at least one of the pattern warning flag and a sensitive message flag, making available to the target sender a confirmation warning, and, in response to the target sender confirming acceptability of the target recipient to receive the electronic communication, transmitting the electronic communication to the target recipient.

20 Claims, 2 Drawing Sheets

METHOD AND SYSTEM FOR COMMUNICATION CONFIRMATION WARNING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to communication technology, and particularly to electronic communication.

2. Description of Background

Electronic communication, which includes electronic mail (email), and instant messaging, for example, has become a popular means for people to communicate. When sending electronic communication, there exists the possibility that information may be inadvertently sent to an unintended recipient. In the context of instant messaging, such inadvertent communication may be made even more likely by the opening of a new message window that has appeared contemporaneously with an existing message exchange, followed by accidental inclusion into the new window of information intended for the existing message exchange.

A current means to prevent unintended communication is to carefully check who is receiving the message before transmitting it. Additionally, some instant messaging clients provide a timestamp to indicate the last instance of communication with a target recipient. However, it may be easy to over look this verification, and transmit a communication to the unintended recipient. Transmission of such a message could reveal sensitive information, or have other unintended consequences. Accordingly, there exists a need in the art for an electronic communication confirmation warning method and system to overcome these drawbacks.

SUMMARY OF THE INVENTION

The shortcomings of the prior art are overcome and additional advantages are provided through the provision of a method and system to provide a warning confirmation to a target sender prior to transmitting an electronic communication to a target recipient.

An embodiment of the invention includes a method to provide a confirmation warning to a target sender of an electronic communication. The confirmation warning is provided prior to transmitting the electronic communication from the target sender to a target recipient, there being an established pattern of communication between the target sender and the target recipient. In response to determining that specified details about the electronic communication are not consistent with details about the established pattern of electronic communication, setting a pattern warning flag and saving those details of the electronic communication determined to be not consistent. In response to detecting the presence of at least one of the pattern warning flag and a sensitive message flag, making available to the target sender a confirmation warning, and, in response to the target sender confirming acceptability of the target recipient to receive the electronic communication, transmitting the electronic communication to the target recipient.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution to examine the contents and context of an electronic communication prior to transmission to the target recipient. An embodiment of the invention will determine if the electronic communication is likely to include sensitive information, or if the target recipient is not, in fact, the recipient to whom the sender intends to send the electronic communication. Accordingly, the sender confidence of electronic communication will be enhanced as a result of the benefits provided by embodiments of the invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In an embodiment of the invention, an electronic communication confirmation warning system (also herein referred to as a warning system) will examine the identity of the target recipient of the electronic communication, content of the electronic communication, and information about the pattern of communication with that target recipient. If the target recipient is someone with whom the target sender does not normally communicate, or the message does not fall into a normal pattern of communication (based on the information available to the warning system), the warning system can warn the sender before transmitting the message. In an embodiment, the confirmation warning will provide the sender an opportunity to cancel the message before transmission.

In an embodiment, the sender can designate a set of keywords as "sensitive". The presence of these keywords in an electronic communication, such as an email or an instant message, for example, will trigger a similar warning message, giving the sender the chance to cancel the transmission of the communication, regardless of the pattern of communication with the recipient. In an embodiment, sender-selected target recipients can be designated as "sensitive", thereby triggering the same warning.

Figure 1:
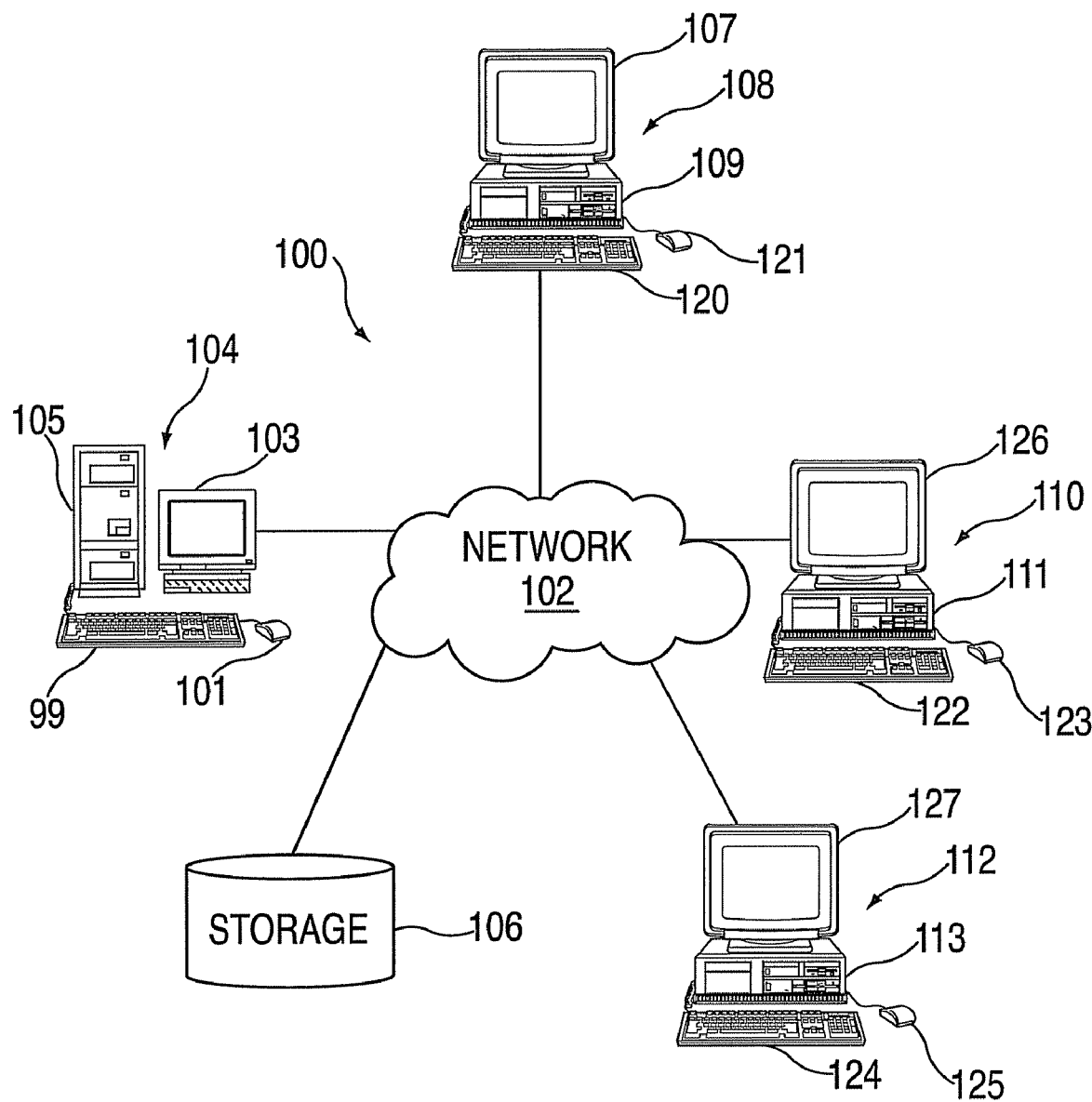
FIG. 1 illustrates one example of an electronic communication confirmation warning system in accordance with an embodiment of the invention.

With reference now to the figures, and in particular, with reference to FIG. 1, a pictorial representation of an electronic communication confirmation warning system 100 in which the present invention may be implemented is depicted.

Warning system 100 is a network of computers in which the present invention may be implemented. The warning system 100 contains a network 102, which is the medium used to provide communications links between various devices and computers connected together within the warning system 100. A network 102 may include permanent connections, such as wire or fiber optic cables, temporary connections made through telephone connections, or wireless connections, for example.

In the depicted example, a server 104 is connected to the network 102 along with storage unit 106. In addition, clients 108, 110, and 112 also are connected to the network 102. These clients 108, 110, and 112 may be, for example, personal computers or network computers. The warning system 100 may include additional servers, clients, and other devices not shown. In the depicted example, the warning system 100 includes the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, the warning system 100 may also be implemented as a number of different types of networks, such as, for example, an Intranet or a local area network.

Each computer 104, 108, 110, 112 within the warning system 100 may have a program storage device 105, 109, 111, 113 to store system, data, application, and electronic communication files, output devices, such as CRT display screens 103, 107, 126, and 127, configured to view the electronic communications, for example, and input devices, such as keyboards 99, 120, 122, and 124, and mice 101, 121, 123, 125, configured to enter text to prepare and provide electronic communications, for example.

While an embodiment of the invention has been described to use keyboards 99, 120, 122, and 124 and mice 101, 121, 123, 125 as input devices, and CRT display screens 103, 107, 126, and 127 as output devices to conduct electronic communication, it will be appreciated that the scope of the invention is not so limited, and that the invention also applies to warning systems that may utilize alternate input and output devices, such as writing tablets, voice recognition, and audio speakers, for example.

In an embodiment, each computer 104, 108, 110, 112 is configured to communicate with the others via the network 102, in a manner known in the art as electronic mail. In another embodiment, each computer 104, 108, 110, 112 is configured to communicate with the others via the network 102, in a manner known in the art as instant messaging.

FIG. 1 is intended as an example, and not as an architectural limitation for the processes of the present invention.

In an embodiment, the target sender will utilize a first computer 108, within the warning system 100, configured to allow electronic communication, to prepare and transmit the electronic communication message for the target recipient. In an embodiment, the target recipient will likewise utilize a second computer 112 within the warning system 100, the second computer 112 configured to allow electronic communication, which will receive the electronic communication transmitted by the sender. As used herein, the term electronic communication will represent the overall process of communication via electronic devices, as well as individual messages that may be contained within an exchange of messages within the electronic communication process.

While an embodiment of the invention has been described with two computers linked together via a common network for the purposes of electronic communication, it will be appreciated that the scope of the invention is not so limited, and that the invention will also apply to other arrangements of computers connected together, such as one network of computers in signal communication with another network of computers that may located as far apart as to be on different continents, for example.

In an exemplary embodiment, the first computer 108 is configured to run an electronic communication confirmation warning system 100 comprising instant messages, to provide a real-time electronic conversation between the sender and a recipient. In an embodiment, the sender will select the target recipient, type a message, and hit "send". In a typical instant messaging system, execution of the "send" command will result in immediate transmission of the electronic communication (also herein referred to as a message) to the target recipient. In an embodiment, the warning system 100 examines details pertaining to an established pattern of communication between the target sender and the target recipient, such as the last time that the sender had communicated with the selected target recipient, for example. The warning system 100 then determines if the details indicate that a period of time, greater than a designated period of time, has elapsed since the sender has last communicated with the target recipient. In response to determining that the period of time since the sender has last communicated with the target recipient exceeds the designated period of time, the warning system 100 will determine that the electronic communication is inconsistent with the communication pattern between the sender and the target recipient. In an embodiment, the warning system 100 is configured to allow the sender to choose the specified period of time absent communication between the sender and the target recipient.

In an embodiment, the warning system 100 is configured to take into account any additional details available about communication patterns between the sender and the target recipient. For example, if the sender and the target recipient normally communicate on Mondays, the warning system 100 is configured take those details into account as well.

While an embodiment of the invention has been described with respect to examining details pertaining to an established pattern of communication between the target sender and the target recipient, such as a period of time that has elapsed between a prior communication of the target sender and the target recipient, it will be appreciated that the scope of the invention is not so limited, and that the invention will also apply to warning systems 100 that may examine alternate established patterns of communication, such as the time of day that the sender and target recipient may normally communicate, the internet protocol (IP) address of the computer from which the sender normally communicates, the IP address of the computer from which the target recipient normally communicates, specified message size requirements, patterns in which the target sender and the target recipient have had no prior electronic communication, and patterns in which the message may have included file attachments or links to websites, for example.

In an embodiment, if the warning system 100 determines that the electronic communication is inconsistent with the established communication pattern between the sender and the target recipient, the warning system 100 will set a pattern warning flag, and save the details, such as the date of the last communication between the sender and the target recipient, for example, that are related to the determination that the electronic communication is inconsistent with the established communication pattern. In alternative embodiment, instead of setting the pattern warning flag, the warning system 100 is configured to immediately present a warning box in response to the determination of the electronic communication inconsistent with the established communication pattern. However, doing so may result in multiple warnings if the sender decides to proceed with the transmission of the message, and the message also fails to meet other screening criteria, as will be discussed further below. In another embodiment, the warning system 100 is configured to allow the user to specify whether the warning system 100 will provide the immediate warning, or set the pattern warning flag.

While an embodiment of the invention has been described having an electronic communication confirmation warning system 100 comprising instant messages, it will be appreciated that the scope of the invention is not so limited, and that the invention will also apply to other methods of electronic communication between a sender and target recipient of a message, such as electronic mail (email), and using radio waves to transmit the electronic communication to any one of a number of portable devices, such as pagers and cellular telephones, for example, in a manner that may be known as text messaging, for example. In another embodiment, information about communication patterns could be combined from both email and instant messaging, and examined, such as if the sender is attempting to send an instant message to the target recipient to whom the sender has never sent an email, for example.

In an embodiment, the warning system 100 will determine if the message contains sensitive content, such as specific keywords, such as "salary", particular project names, and the names of specific people, for example. In an embodiment, the warning system 100 is configured to determine if the target recipient, to whom the message has been addressed, has been designated as a sensitive recipient, such that messages to the sensitive recipient are of significant importance. In an embodiment, the warning system 100 is configured to allow the sender to specify a list of recipients to be designated as sensitive recipients. Examples of sensitive recipients may be supervisors, clients, or any other recipient to whom a mistakenly sent message could have unintended consequences. If the warning system 100 determines the presence of at least one of the sensitive content and the sensitive recipient, it will set a sensitive message warning flag and save the details about what it has determined to be sensitive within the message. In an alternative embodiment, rather than setting the sensitive message warning flag, the warning system 100 is configured to immediately present a warning box in response to the determination of the presence of the sensitive details.

In an embodiment, before allowing the message to be transmitted, the warning system 100 first checks for the presence of both the pattern warning flag and the sensitive message warning flag. If the warning system 100 detects that at least one of the pattern warning flag and the sensitive warning flag is set, the warning system 100 will make available, or display, to the user a warning box containing the detailed information that was saved when the corresponding flag was set. Display of the detailed information saved in conjunction with the corresponding flag will allow the sender to more quickly determine if the electronic communication is acceptable to be sent to the target recipient. In an embodiment, the warning box will prompt the sender to confirm if they are certain that they want to transmit the message to the target recipient. If the sender responds in the affirmative, that they want to transmit the message, the message will be transmitted as a normal electronic communication transaction. If the sender responds in the negative, the transmission of the message is cancelled, thereby allowing the target sender to determine the appropriate target recipient.

In an embodiment, the warning system 100 is configured to allow the sender to have the ability to configure all aspects of the message examination within the warning system 100, and turn the warning system 100 off either completely or on per-recipient basis. For example, in an embodiment, the warning system 100 is configured to allow the sender to designate a list that will include certain recipients that are preferred recipients. In response to the sender creating a message addressed to one of the preferred recipients, the warning system 100 is configured to suspend all warnings related to communication with the preferred recipient.

In another embodiment, in response to confirmation by the sender that they intend to send a first message to the target recipient, the warning system 100 is configured to suppress, or turn off, any subsequent warnings that would have been generated for a remainder of a group of electronic communications with the same target recipient. In an embodiment, the warning system 100 is configured to suppress the subsequent warnings for subsequent electronic communications in response to the sender explicitly and directly selecting that option for each group of electronic communications. In another embodiment, the subsequent warnings will be suppressed automatically in response to a sender-selected configuration setting of the warning system 100. In an embodiment, the warning system 100 is configured to suppress the subsequent warnings for the group of messages that are related to the first message by topic. In another embodiment, the warning system 100 is configured to suppress the subsequent warnings for the group of messages that are created within a sender-selected period of time subsequent to the first message.

Figure 2:
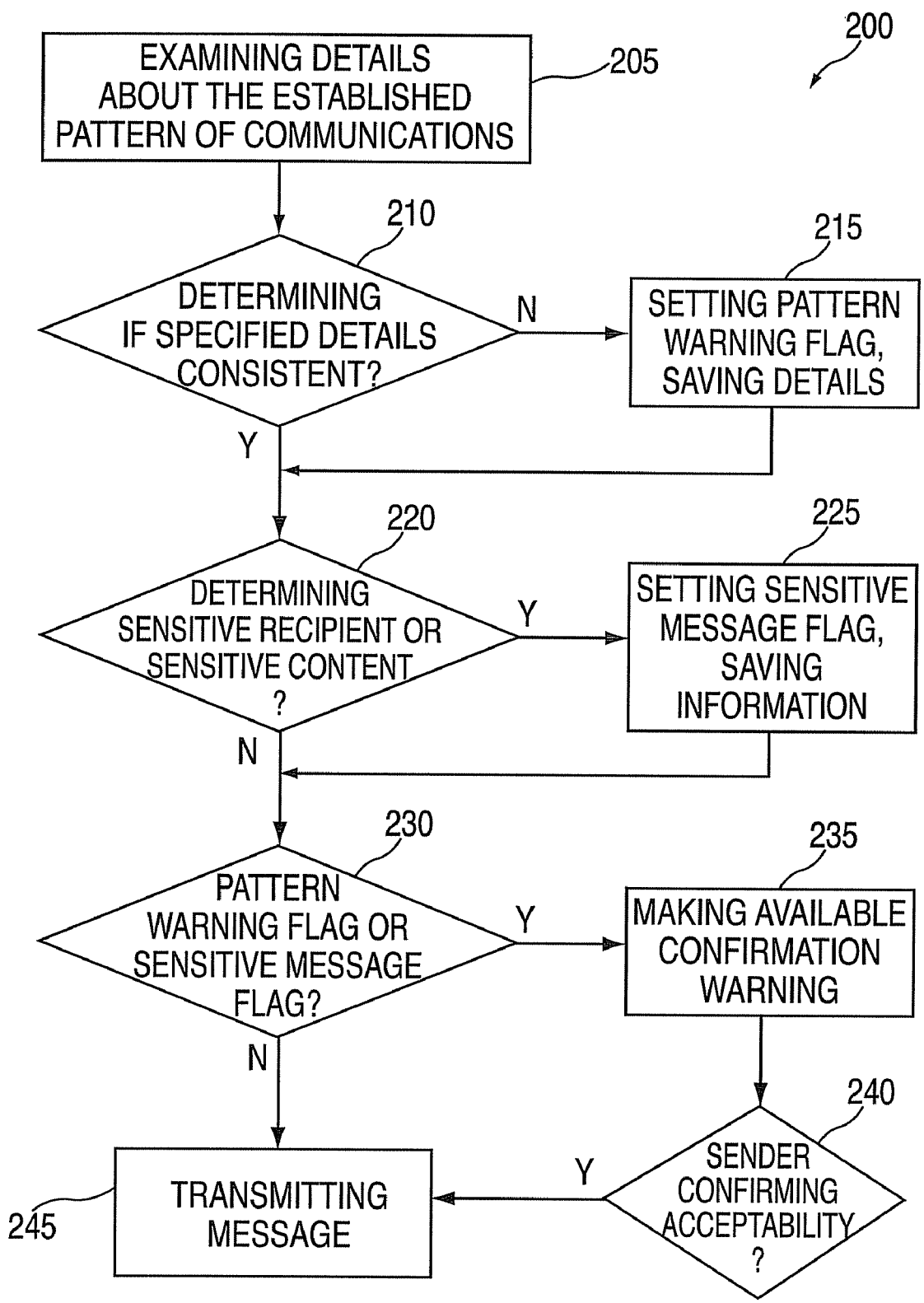
FIG. 2 illustrates one example of a flowchart of an embodiment of a method to provide a confirmation warning to a target sender of an electronic communication prior to transmitting the electronic communication in accordance with an embodiment of the invention The detailed description explains the preferred embodiments of the invention, together with advantages and features, by way of example with reference to the drawings.

In view of the foregoing, the warning system 100 performs the method of providing a confirmation warning to the target sender of an electronic communication prior to transmitting the electronic communication, there being an established pattern of communication between the target sender and the target recipient. Referring now to FIG. 2, a flow chart 200 of an embodiment of the method is depicted.

The method begins with examining 205 details about the established pattern of communication between the target sender and the target recipient, and determining 210 if specified details about the electronic communication are consistent with the details about the established pattern of communication.

In response to determining 210 that the specified details about the electronic communication are not consistent with the details about the established pattern of electronic communication, setting 215 the pattern warning flag and saving those details of the electronic communication determined to be not consistent.

The method continues with determining 220 if the target recipient of the electronic communication has been designated as the sensitive recipient, or if the electronic communication comprises content that has been designated as sensitive. In response to determining 220 that the target recipient of the electronic communication has been designated as the sensitive recipient, setting 225 the sensitive message flag, and saving information about the sensitive recipient. In response to determining 220 that the electronic communication comprises content that has been designated as sensitive, setting 225 the sensitive message flag, and saving information about the content determined to be sensitive.

In response to detecting 230 the presence of at least one of the pattern warning flag and the sensitive message flag, making available 235 to the target sender the confirmation warning including at least one of the saved details of the electronic communication not consistent with the established pattern of communication, the saved information about the sensitive recipient, and the saved information about the content determined to be sensitive. If the target sender responds to the warning by confirming 240 acceptability of the target recipient to receive the electronic communication, the method will conclude by transmitting 245 the electronic communication to the target recipient. If the target sender does not confirm acceptability of the target recipient to receive the electronic communication, the message will not be sent, and the sender will have the opportunity to change the addressee or cancel the message altogether as appropriate.

In an embodiment, the transmitting 245 the electronic communication to the target recipient comprises transmitting 245 the instant message to the target recipient. In another embodiment, the transmitting 245 the electronic communication to the target recipient comprises transmitting the email message to the target recipient. In another embodiment, the transmitting 245 the electronic communication to the target recipient comprises transmitting the text message to the target recipient. In an embodiment, the method further comprises designating at least two target recipients as the sensitive recipient. In an embodiment, the method further comprises designating at least one keyword as sensitive content.

In an embodiment, to determine if the electronic communication is consistent with the established pattern of communication, the method includes designating the period of time absent communication between the target sender and the target recipient as the designated period of time. The determining if specified details about the electronic communication are consistent with the details about the established pattern of communication will therefore comprise a predefined inconsistent pattern if another period of time absent communication between the target sender and the target recipient is greater than the designated period of time.

The sender may desire to suppress subsequent warnings that relate to subsequent communication with the same target recipient. Accordingly, in an embodiment, in response to the target sender confirming acceptability of the target recipient to receive the first electronic communication, the method will include disabling subsequent waning messages for subsequent electronic communications between the target sender and the target recipient related to the same topic of the first electronic communication. In another embodiment, the method will include disabling subsequent warning messages for subsequent electronic communications sent within a specified period of time subsequent to the first electronic communication. In an embodiment, the disabling subsequent warning messages occurs automatically in response to a target-sender-selected configuration setting.

In another embodiment, the method will include specifying the list comprising at least one preferred recipient. In an embodiment, the absence of the target recipient from the list comprising at least one preferred recipient is a requirement before any one of the pattern warning flag and the sensitive message flag can be set.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method to provide a confirmation warning to a target sender of an electronic communication prior to transmitting the electronic communication from the target sender to a target recipient, there being an established pattern of communication between the target sender and the target recipient, the method comprising:

examining details about the established pattern of communication between the target sender and the target recipient;

determining if specified details about the electronic communication are consistent with the details about the established pattern of communication;

in response to determining that the specified details about the electronic communication are not consistent with the details about the established pattern of electronic communication, setting a pattern warning flag and saving those details of the electronic communication determined to be not consistent;

determining if the target recipient of the electronic communication has been designated as a sensitive recipient;

determining if the electronic communication comprises content that has been designated as sensitive;

in response to determining that the target recipient of the electronic communication has been designated as the sensitive recipient, setting a sensitive message flag, and saving information about the sensitive recipient;

in response to determining that the electronic communication comprises content that has been designated as sensitive, setting the sensitive message flag, and saving information about the content determined to be sensitive;

in response to detecting the presence of at least one of the pattern warning flag and the sensitive message flag, making available to the target sender a confirmation warning including at least one of the saved details of the electronic communication not consistent with the established pattern of communication, the saved information about the sensitive recipient, and the saved information about the content determined to be sensitive; and in response to the target sender confirming acceptability of the target recipient to receive the electronic communication, transmitting the electronic communication to the target recipient.

2. The method of claim 1, wherein:
the transmitting the electronic communication to the target recipient comprises transmitting an instant message to the target recipient.

3. The method of claim 1, wherein:
the transmitting the electronic communication to the target recipient comprises transmitting an electronic mail (email) message to the target recipient.

4. The method of claim 1, further comprising:
designating at least two target recipients as the sensitive recipient.

5. The method of claim 1, further comprising:
designating at least one keyword as sensitive content.

6. The method of claim 1, further comprising:
designating a period of time absent communication between the target sender and the target recipient as a designated period of time;
wherein the determining if specified details about the electronic communication are consistent with the details about the established pattern of communication comprises a predefined inconsistent pattern if another period of time absent communication between the target sender and the target recipient is greater than the designated period of time.

7. The method of claim 1, further comprising:
in response to the target sender confirming acceptability of the target recipient to receive a first electronic communication, disabling subsequent warning messages for subsequent electronic communications between the target sender and the target recipient related to a same topic of the first electronic communication.

8. The method of claim 7, wherein:
the disabling subsequent warning messages occurs automatically in response to a target-sender-selected configuration setting.

9. The method of claim 1, further comprising:
in response to the target sender confirming acceptability of the target recipient to receive a first electronic communication, disabling subsequent warning messages for subsequent electronic communications sent within a specified period of time subsequent to the first electronic communication.

10. The method of claim 9, wherein:
the disabling subsequent warning messages occurs automatically in response to a target-sender-selected configuration setting.

11. The method of claim 1, further comprising:
specifying a list comprising at least one preferred recipient;
wherein in response to determining that the list comprising at least one preferred recipient does not comprise the target recipient, and that the specified details about the electronic communication are not consistent with the details about the established pattern of electronic communication, setting the pattern warning flag and saving the details determined to be not consistent;
wherein in response to determining that the list comprising at least one preferred recipient does not comprise the target recipient, and determining that the target recipient of the electronic communication has been designated as the sensitive recipient, setting the sensitive message flag, and saving information about the sensitive recipient; and
wherein in response to determining that the list comprising at least one preferred recipient does not comprise the target recipient, and determining that the electronic communication comprises content that has been designated as sensitive, setting the sensitive message flag, and saving information about the content determined to be sensitive.

12. A program storage device readable by a computer, the device embodying a program or instructions executable by the computer to perform the method of claim 1.

13. A communication confirmation warning system to provide a confirmation warning to a target sender of an electronic communication prior to transmitting the electronic communication from the target sender to a target recipient, there being an established pattern of communication between the target sender and the target recipient, the method comprising:
means for examining details about the established pattern of communication between the target sender and the target recipient;
means for determining if specified details about the electronic communication are consistent with the details about the established pattern of communication;
means for setting a pattern warning flag and saving those details of the electronic communication determined to be not consistent, in response to determining that the specified details about the electronic communication are not consistent with the details about the established pattern of electronic communication;
means for determining if the target recipient of the electronic communication has been designated as a sensitive recipient;
means for determining if the electronic communication comprises content that has been designated as sensitive;
means for setting a sensitive message flag and saving information about the sensitive recipient, in response to determining that the target recipient of the electronic communication has been designated as the sensitive recipient;
means for setting the sensitive message flag, and saving information about the content determined to be sensitive, in response to determining that the electronic communication comprises content that has been designated as sensitive;
means for making available to the target sender a confirmation warning including at least one of the saved details of the electronic communication not consistent with the established pattern of communication, the saved information about the sensitive recipient, and the saved information about the content determined to be sensitive, in response to detecting the presence of at least one of the pattern warning flag and the sensitive message flag; and
means for transmitting the electronic communication to the target recipient, in response to the target sender confirming acceptability of the target recipient to receive the electronic communication.

14. The system of claim 13, wherein:
the means for transmitting the electronic communication to the target recipient comprise means for transmitting an instant message to the target recipient.

15. The system of claim 13, further comprising:
means for designating a period of time absent communication between the target sender and the target recipient as a designated period of time;
wherein the specified details about the electronic communication comprise a predefined inconsistent pattern if another period of time absent communication between the target sender and the target recipient is greater than the designated period of time.

16. The system of claim 13, further comprising:

means for disabling subsequent warning messages for subsequent electronic communications between the target sender and the target recipient related to a same topic of a first electronic communication, in response to the target sender confirming acceptability of the target recipient to receive the first electronic communication.

17. The system of claim 16, wherein:

the means for disabling subsequent warning messages is configured to disable subsequent warning messages automatically, in response to a target-sender-selected configuration setting.

18. The system of claim 13, further comprising:

means for disabling subsequent warning messages for subsequent electronic communications sent within a specified time subsequent to a first electronic communication, in response to the target sender confirming acceptability of the target recipient to receive the first electronic communication.

19. The system of claim 18, wherein:

the means for disabling subsequent warning messages is configured to disable subsequent warning messages automatically, in response to a target-sender-selected configuration setting.

20. The system of claim 13, further comprising:

means for specifying a list comprising at least one preferred recipient;

wherein the means for setting the pattern warning flag and saving the details determined to be not consistent is configured to be responsive to the determination that the list comprising at least one preferred recipient does not comprise the target recipient, and that the specified details about the electronic communication are not consistent with the details about the established pattern of electronic communication;

wherein the means for setting the sensitive message flag and saving information about the sensitive recipient is configured to be responsive to the determination the list comprising at least one preferred recipient does not comprise the target recipient, and determining that the target recipient of the electronic communication has been designated as the sensitive recipient; and wherein the means for setting the sensitive message flag, and saving information about the content determined to be sensitive is configured to be responsive to the determination that the list comprising at least one preferred recipient does not comprise the target recipient, and determining that the electronic communication comprises content that has been designated as sensitive.

* * * * *